(12) United States Patent
Yabunouchi

(10) Patent No.: US 6,255,244 B1
(45) Date of Patent: Jul. 3, 2001

(54) POLYMERIZATION CATALYSTS FOR OLEFINIC AND STYRENIC MONOMER AND POLYMER PRODUCTION METHOD

(75) Inventor: Nobuhiro Yabunouchi, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/391,343

(22) Filed: Sep. 8, 1999

(30) Foreign Application Priority Data

Oct. 15, 1999 (JP) .................................................. 10-260377

(51) Int. Cl.$^7$ ........................................................ B01J 21/16
(52) U.S. Cl. .............................. 502/80; 502/84; 502/102; 502/103; 502/117; 502/118; 502/104; 502/109; 526/127; 526/129
(58) Field of Search ..................................... 526/127, 129; 502/117, 80, 84, 102, 103, 118, 104, 109

(56) References Cited

U.S. PATENT DOCUMENTS

| | | |
|---|---|---|
| 5,739,225 | 4/1998 | Tazaki et al. . |
| 5,854,165 | 12/1998 | Yabunouchi et al. . |
| 6,048,817 * | 4/2000 | Sagae et al. .......................... 502/117 |

* cited by examiner

*Primary Examiner*—David W. Wu
*Assistant Examiner*—William Cheung
(74) *Attorney, Agent, or Firm*—Oblon, Spivak, McClelland, Maier & Neustadt, P.C.

(57) ABSTRACT

A catalyst for polymerization of olefins or styrenes, which is prepared by contacting (A) a transition metal compound, (B) at least one material selected from the group consisting of oxygen-containing compounds and compounds which react with a transition metal compound to form an ionic complex, and optionally (C) an alkylating agent with each other, and contacting these materials (A), (B) and (C) with an adsorbing substance (D), during or after the contact of materials (A), (B) and (C) with each other, followed by removing the adsorbing substance (D) from the contacted materials (A), (B) and (C).

12 Claims, No Drawings

POLYMERIZATION CATALYSTS FOR OLEFINIC AND STYRENIC MONOMER AND POLYMER PRODUCTION METHOD

BACKGROUND OF THE INVENTION

1. Field of the Invention

The present invention relates to a catalyst for polymerization of olefins or styrenes, and to a method for producing polymers. Precisely, the invention relates to a catalyst for polymerization of olefins or styrenes, which has the advantage of efficiently and inexpensively producing olefinic polymers or styrenic polymers, and also to a method for producing polymers in which is used the catalyst.

2. Description of the Background

Recently, catalysts for polymer production comprising, as the catalytic component, a transition metal compound having a π-ligand, which are referred to as metallocene catalysts, have been developed and used in producing olefinic polymers and styrenic polymers.

However, the catalysts require a large amount of a catalyst promoter such as aluminoxanes in order that they could display high polymerization activity. Therefore, the catalysts are problematic in that their costs are high and that a catalyst residue derived from the catalyst promoter used remains in the polymers produced to cause coloration of the polymers.

In order to reduce the amount of the catalyst promoter to be used, techniques of using clay, clay minerals and the like in place of aluminoxanes have been proposed (see Japanese Patent Laid-Open Nos. 301917/1993 and 136047/1994). At present, however, the techniques could not still give high-activity catalysts capable of overcoming the problems noted above.

SUMMARY OF THE INVENTION

Given that situation, the object of the present invention is to provide a catalyst for polymerization of olefins or styrenes, which has the advantage of efficiently and inexpensively producing olefinic polymers or styrenic polymers, and also to provide a method for producing polymers in which is used the catalyst. Especially for styrene monomers, the object of the invention is to provide a catalyst for polymerization of styrenes, which has the advantage of efficiently and inexpensively producing styrenic polymers essentially having a syndiotactic structure, and also to provide a method for producing such styrenic polymers in which is used the catalyst.

We, the present inventors have assiduously studied so as to attain the object noted above, and, as a result, have found that a polymerization catalyst as obtained through specific treatment of a transition metal compound has improved polymerization activity. On the basis of this finding, we have completed the present invention.

Specifically, the invention is to provide a catalyst for polymerization of olefins or styrenes, and a method for producing polymers, which are as follows:

1. A catalyst for polymerization of olefins or styrenes, which is obtained by contacting (A) a transition metal compound, (B) an oxygen-containing compound and/or a compound capable of reacting with a transition metal compound to form an ionic complex, and optionally (C) an alkylating agent with each other, with further contacting them with (D) an adsorbing substance during or after the contacting treatment, then followed by removing the adsorbing substance.

2. The catalyst for polymerization of olefins or styrenes of above 1, wherein the adsorbing substance (D) is a porous substance.

3. The catalyst for polymerization of olefins or styrenes of above 1, wherein the adsorbing substance (D) is an inorganic oxide.

4. The catalyst for polymerization of olefins or styrenes of above 1, wherein the adsorbing substance (D) is any of clay, clay minerals and ion-exchanging layered compounds.

5. The catalyst for polymerization of olefins or styrenes of above 1, wherein the adsorbing substance (D) is any of phyllosilicic acid compounds.

6. The catalyst for polymerization of olefins or styrenes of above 1, wherein the adsorbing substance (D) is any of montmorillonites.

7. The catalyst for polymerization of olefins or styrenes of any one of above 1 to 6, wherein the adsorbing substance (D) has a specific surface area of at least 30 m²/g as measured according to the BET method.

8. The catalyst for polymerization of olefins or styrenes of any one of above 1 to 6, wherein the adsorbing substance (D) has a pore volume of at least 0.001 cm³/g as measured according to the BET method.

9. The catalyst for polymerization of olefins or styrenes of any one of above 1 to 8, wherein the transition metal compound (A) is any of compounds of a transition metal of Groups 4 to 6 or Groups 8 to 10 of the Periodic Table.

10. The catalyst for polymerization of olefins or styrenes of above 9, wherein the transition metal compound (A) is represented by any of the following general formulae (1) to (5):

$$Q^1{}_a(C_5H_{5-a-b}R^1{}_b)(C_5H_{5-a-c}R^2{}_c)M^1X^1Y^1 \quad (1)$$

$$Q^2{}_a(C_5H_{5-a-d}R^3{}_d)Z^1M^1X^1Y^1 \quad (2)$$

$$(C_5H_{5-e}R^4{}_e)M^1X^1Y^1W^1 \quad (3)$$

$$M^1X^1Y^1W^1U^1 \quad (4)$$

$$L^1L^2M^2X^1Y^1 \quad (5)$$

where $Q^1$ represents a bonding group that crosslinks the two conjugated five-membered cyclic ligands $(C_5H_{5-a-b}R^1{}_b)$ and $(C_5H_{5-a-c}R^2{}_c)$;

$Q^2$ represents a bonding group that crosslinks the conjugated five-membered cyclic ligand $(C_5H_{5-a-d}R^3{}_d)$ and the group $Z^1$;

$(C_5H_{5-e}R^4{}_e)$ represents a conjugated five-membered cyclic ligand; $R^1$, $R^2$, $R^3$ and $R^4$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure;

a represents 0, 1 or 2;

b, c and d each represent an integer of from 0 to 5 when a=0, or an integer of from 0 to 4 when a=1, or an integer of from 0 to 3 when a=2;

e represents an integer of from 0 to 5;

$M^1$ represents a transition metal of Groups 4 to 6 of the Periodic Table;

$M^2$ represents a transition metal of Groups 8 to 10 of the Periodic Table;

$L^1$ and $L^2$ each represent a coordination-bonding ligand;

$X^1, Y^1, Z^1, W^1$ and $U^1$ each represent a covalent-bonding or ionic-bonding ligand; and $L^1, L^2, X^1, Y^1, W^1$ and $U^1$ may be bonded to each other to form a cyclic structure.

11. The catalyst for polymerization of olefins or styrenes of above 10, wherein the transition metal compound (A) is of formula (3) and the group $(C_5H_{5-e}R^4{}_e)$ in formula (3) is any of the following general formulae (I) to (VII):

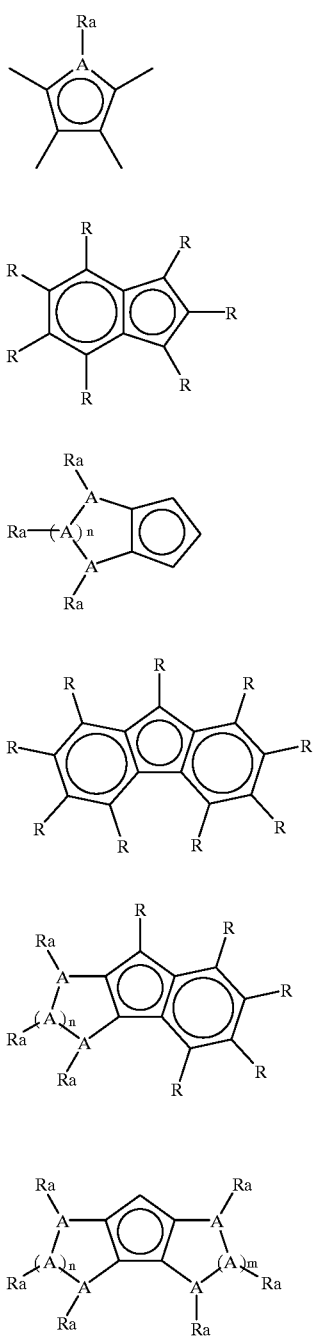

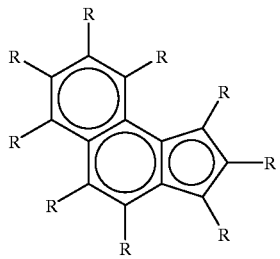

where

A represents an element of Group 13, 14, 15 or 16, and plural A's may be the same or different;

R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and optionally may be bonded to each other to form a cyclic structure;

a represents 0, 1 or 2; and n and m each represent an integer of 1 or more.

12. A method for producing olefinic polymers, which comprises polymerizing olefins in the presence of the polymerization catalyst of any one of above 1 to 11.

13. A method for producing styrenic polymers, which comprises polymerizing styrenes in the presence of the polymerization catalyst of any one of above 1 to 11.

14. The method for producing styrenic polymers of above 13, wherein the styrenic polymers produced essentially have a syndiotactic structure.

DETAILED DESCRIPTION OF THE INVENTION

Embodiments of the invention are described in detail hereinunder.

1. Catalyst for Polymerization of Olefins or Styrenes

The catalyst for polymerization of olefins or styrenes of the invention is obtained by contacting (A) a transition metal compound, (B) an oxygen-containing compound and/or a compound capable of reacting with a transition metal compound to form an ionic complex, and optionally (C) an alkylating agent with each other, with further contacting them with (D) an adsorbing substance during or after the contacting treatment, then followed by removing the adsorbing substance. Preferably, the catalyst is obtained by contacting (A) a transition metal compound, (B) an oxygen-containing compound and/or a compound capable of reacting with a transition metal compound to form an ionic complex, and optionally (C) an alkylating agent with each other, then further contacting them with (D) an adsorbing substance, and thereafter removing the adsorbing substance.

In preparing the catalyst of the invention, the order of contacting the constituent components with each other is not specifically defined. The components may be contacted with each other in any mode, for example, as mentioned below.

Where the component (A), the component (B) and the component (D) are used in preparing the catalyst, for example, (1) the component (A) is first contacted with the component (B), and then with the component (D), and thereafter the component (D) is removed; or (2) the component (A) is first contacted with the component (D), and then with the component (B), and thereafter the component (D) is removed; or (3) the component (B) is first contacted with the component (D), and then with the component (A), and thereafter the component (D) is removed; or (4) the three components are contacted with each other all at a time, and thereafter the component (D) is removed.

Where the optional component (C) is further used in preparing the catalyst, the order of contacting the component (C) with the other components is not also specifically defined. For example, the component (C) is first contacted with the component (A) and then with the other components; or the component (C) is first contacted with the component (B) and then with the other components; or the component (C) is first contacted with the component (D) and then with the other components. Preferably, however, the component (C) is first contacted with the component (A) or the component (B) and then with the other components, and then with the component (D); or the component (A), the component (B) and the component (C) are contacted with each other and then with the component (D).

After the component (A), the component (B) and the optional component (C) are contacted with each other, they are further contacted with the component (D). The period of time between the former contacting treatment and the latter contacting treatment varies, depending on the type of the components (A), the component (B) and the optional component (C) and on the temperature thereof, but is preferably 1 minute or longer.

Contacting the catalytic components with each other may be effected in an inert gas such as nitrogen or the like, at a temperature not higher than the temperature at which monomers are polymerized in the presence of the catalyst. If desired, it may be effected at a temperature falling between −30 and 200° C.

Regarding the period of time for which the catalytic components are kept contacted with the component (D), for example, the component (D) may be removed immediately after it has been contacted with the catalytic components; or on the contrary, the catalytic components may be kept contacted with the component (D) for a long period of time, for example, for about one week, and thereafter the component (D) may be removed. Preferably, the catalytic components are kept contacted with the component (D) for 10 minutes to 5 hours, and thereafter the component (D) is removed.

The way of removing the component (D) is not specifically defined. For example, the necessary components are contacted with each other with stirring them, and then kept static for a while, and thereafter the resulting supernatant is collected. Regarding the period of time for which the components are kept static, for example, the components are stirred so as to be contacted with each other, then stirring them is stopped, and thereafter they are kept static for about 5 minutes.

The ratio of the components to be contacted with each other is described. Where the component (B) is an oxygen-containing compound, for example, that having aluminium, the ratio by mol of the aluminium atom in the component (B) to the transition metal in the component (A) may fall generally between 0.1/1 and 100000/1, but preferably between 0.5/1 and 10000/1. Where the component (B) is a compound of formula (9) or (10) to be mentioned hereinunder, the ratio by mol of the metal of $M^3$ or $M^4$ in the component (B) to the transition metal in the component (A) may fall generally between 0.1/1 and 100/1, but preferably between 0.5/1 and 10/1.

Where the optional component (C) is an organoaluminium compound, the ratio by mol of the aluminium atom in the component (C) to the transition metal in the component (A) may fall generally between 0.1/1 and 100000/1, but preferably between 0.5/1 and 10000/1.

The amount of the component (D) to be contacted with the catalytic components may be generally from 0.01 g to 10000 g, but preferably from 0.1 g to 1000 g, relative to 1 mmol of the component (A).

The solution as prepared by contacting the catalytic components with the component (D) followed by removing the component (D) generally contains from 0 g to 100 g, but preferably from 0 g to 10 g of the component (D), relative to 1 mmol of the component (A) therein.

Transition Metal Complexes for Component (A)

As the component (A), various types of transition metal complexes are employable. Preferred are compounds of a transition metal of Groups 4 to 6 of the Periodic Table, and compounds of a transition metal of Groups 8 to 10 thereof. Preferred examples of the compounds of a transition metal of Groups 4 to 6 of the Periodic Table are those of the following general formulae (1) to (4). Preferred examples of the compounds of a transition metal of Groups 8 to 10 of the Periodic Table are those of the following general formula (5):

$$Q^1{}_a(C_5H_{5-a-b}R^1{}_b)(C_5H_{5-a-c}R^2{}_c)M^1X^1Y^1 \quad (1)$$

$$Q^2{}_a(C_5H_{5-a-d}R^3{}_d)Z^1M^1X^1Y^1 \quad (2)$$

$$(C_5H_{5-e}R^4{}_e)M^1X^1Y^1W^1 \quad (3)$$

$$M^1X^1Y^1W^1U^1 \quad (4)$$

$$L^1L^2M^2X^1Y^1 \quad (5)$$

where $Q^1$ represents a bonding group that crosslinks the two conjugated five-membered cyclic ligands $(C_5H_{5-a-b}R^1{}_b)$ and $(C_5H_{5-a-c}R^2{}_c)$;

$Q^2$ represents a bonding group that crosslinks the conjugated five-membered cyclic ligand $(C_5H_{5-a-d}R^3{}_d)$ and the group $Z^1$;

$(C_5H_{5-e}R^4{}_e)$ represents a conjugated five-membered cyclic ligand;

$R^1$, $R^2$, $R^3$ and $R^4$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure;

a represents 0, 1 or 2;

b, c and d each represent an integer of from 0 to 5 when a=0, or an integer of from 0 to 4 when a=1, or an integer of from 0 to 3 when a=2;

e represents an integer of from 0 to 5;

$M^1$ represents a transition metal of Groups 4 to 6 of the Periodic Table;

$M^2$ represents a transition metal of Groups 8 to 10 of the Periodic Table;

$L^1$ and $L^2$ each represent a coordination-bonding ligand;

$X^1, Y^1, Z^1, W^1$ and $U^1$ each represent a covalent-bonding or ionic-bonding ligand; and $L^1, L^2, X^1, Y^1, W^1$ and $U^1$ may be bonded to each other to form a cyclic structure.

Specific examples of $Q^1$ and $Q^2$ in formulae (1) and (2) include (1) an alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.; (2) a silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.; and (3) a hydrocarbon group (e.g., a lower alkyl group, a phenyl group, a hydrocarbyloxy group (preferably, a lower alkoxy group), etc.) containing germanium, phosphorus, nitrogen, boron or aluminium, such as a $(CH_3)_2Ge$ group, a $(C_6H_5)_2Ge$ group, a $(CH_3)P$ group, a $(C_6H_5)P$ group, a $(C_4H_9)N$ group, a $(C_6H_5)N$ group, a $(CH_3)B$ group, a $(C_4H_9)B$ group, a $(C_6H_5)B$ group, a $(C_6H_5)Al$ group, a $(CH_3O)Al$ group, etc. Of those, preferred are alkylene groups and silylene groups.

$(C_5H_{5-a-b}R^1_b)$ $(C_5H_{5-a-c}R^2_c)$ and $(C_5H_{5-a-d}R^3_d)$ are conjugated, 5-membered cyclic ligands, in which $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represent an integer of from 0 to 5 when a=0, or an integer of from 0 to 4 when a=1, or an integer of from 0 to 3 when a=2. The hydrocarbon group preferably has from 1 to 20 carbon atoms, more preferably from 1 to 12 carbon atoms. The hydrocarbon group may be a monovalent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl groups, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of $-Si$ $(R^5)$ $(R^6)$ $(R^7)$, in which $R^5$, $R^6$ and $R^7$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of $-P(R^8)$ $(R^9)$, $-N(R^8)$ $(R^9)$, and $-B(R^8)$ $(R^9)$, respectively, in which $R^8$ and $R^9$ each represent a hydrocarbon group having from 1 to 18 carbon atoms. Plural $R^1$'s, $R^2$'s and $R^3$'s, if any, may be the same or different ones, respectively. In formula (1), the conjugated, 5-membered cyclic ligands $(C_5H_{5-a-b}R^1_b)$ and $(C_5H_{5-a-c}R^2_c)$ may be the same or different ones.

$M^1$ represents a transition metal element of Groups 4 to 6 of the Periodic Table, including, for example, titanium, zirconium, hafnium, niobium, molybdenum, tungsten, etc. Of those, preferred are titanium, zirconium and hafnium.

$Z^1$ represents a covalent-bonding ligand, including, for example, an oxygen atom (—O—), a sulfur atom (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms, and a phosphorus-containing hydrocarbon group having from 1 to 40, preferably from 1 to 18 carbon atoms.

$X^1$ and $Y^1$ each represent a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), a hydrocarbon group having from 1 to 20, preferably from 1 to 12 carbon atoms, and a boron compound residue (e.g., $B(C_6H_5)_4$, $BF_4$). Of those, preferred are halogen atoms, alkoxy groups and hydrocarbon groups. $X^1$ and $Y^1$ may be the same or different ones. $X^1$ and $Y^1$ may be bonded to each other to form a cyclic structure.

In formula (3), $(C_5H_{5-e}R^4_e)$ represents a conjugated five-membered cyclic ligand; and $R^4$ is the same as any of $R^1$ to $R^3$ noted above. e represents an integer of from 1 to 5. $M^1$ represents a transition metal of Groups 4 to 6 of the Periodic Table, such as that mentioned above; and $X^1$ and $Y^1$ have the same meanings as above. $W^1$ is the same as any of $X^1$ and $Y^1$ Specifically, $W^1$ represents a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), a hydrocarbon group having from 1 to 20, preferably from 1 to 12 carbon atoms, and a boron compound residue (e.g., $B(C_6H_5)_4$, $BF_4$). Of those, preferred are halogen atoms, alkoxy groups and hydrocarbon groups. $X^1$, $Y^1$ and $W^1$ may be the same or different ones. $X^1$, $Y^1$ and $W^1$ may be bonded to each other to form a cyclic structure.

In formula (4), $M^1$ represents a transition metal of Groups 4 to 6 of the Periodic Table, such as that mentioned above; and $X^1$, $Y^1$ and $W^1$ have the same meanings as above. $U^1$ is the same as any of $X^1$, $Y^1$ and $W^1$. Specifically, $U^1$ represents a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), a hydrocarbon group having from 1 to 20, preferably from 1 to 12 carbon atoms, and a boron compound residue (e.g., $B(C_6H_5)_4$, $BF_4$). Of those, preferred are halogen atoms and hydrocarbon groups. $X^1, Y^1, W^1$ and $U^1$ may be the same or different ones. $X^1, Y^1, W^1$ and $U^1$ may be bonded to each other to form a cyclic structure.

(I) As specific examples of the transition metal compounds of formulae (1) and (2), mentioned are the following compounds. (i) Transition metal compounds not having a crosslinkable bonding group but having two conjugated, 5-membered cyclic ligands, such as bis(cyclopentadienyl) titanium dichloride, bis(methylcyclopentadienyl)titanium dichloride, bis(dimethylcyclopentadienyl)titanium dichloride, bis(trimethylcyclopentadienyl)titanium dichloride, bis (tetramethylcyclopentadienyl)titanium dichloride, bis(pentamethylcyclopentadienyl)titanium dichloride, bis(n-butylcyclopentadienyl)titanium dichloride, bis(indenyl)titanium dichloride, bis(fluorenyl)titanium dichloride, bis(cyclopentadienyl)titanium chlorohydride, bis(cyclopentadienyl)methyltitanium chloride, bis(cyclopentadienyl)ethyltitanium chloride, bis(cyclopentadienyl)phenyltitanium chloride, bis(cyclopentadienyl)dimethyltitanium, bis(cyclopentadienyl) diphenyltitanium, bis(cyclopentadienyl) dineopentyltitanium, bis(cyclopentadienyl)dihydrotitanium, (cyclopentadienyl)(indenyl)titanium dichloride, (cyclopentadienyl)(fluorenyl)titanium dichloride, etc.

(ii) Transition metal compounds having two conjugated, 5-membered cyclic ligands, in which the two ligands are crosslinked with an alkylene group, such as methylenebis(indenyl)titanium dichloride, ethylenebis(indenyl)titanium dichloride, methylenebis(indenyl)titanium chlorohydride, ethylenebis(indenyl)methyltitanium chloride, ethylenebis(indenyl)methoxychlorotitanium, ethylenebis(indenyl) titanium diethoxide, ethylenebis(indenyl)dimethyltitanium, ethylenebis(4,5,6,7-tetrahydroindenyl)titanium dichloride, ethylenebis(2-methylindenyl)titanium dichloride, ethylenebis(2,4-dimethylindenyl)titanium dichloride, ethylenebis(2-methyl-4-trimethylsilylindenyl)titanium dichloride, ethylenebis(2,4-dimethyl-5,6,7-trihydroindenyl) titanium dichloride, ethylene(2,4-dimethylcyclopentadienyl)(3',5'-dimethylcyclopentadienyl) titanium dichloride, ethylene (2-methyl-4-t-butylcyclopentadienyl)(3'-t-butyl-5'-methylcyclopentadienyl)titanium dichloride, ethylene(2,3,5-trimethylcyclopentadienyl)(2',4',5'-trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl)titanium dichloride, isopropylidene(2,4-dimethylcyclopentadienyl)(3',5'-dimethylcyclopentadienyl)titanium dichloride, isopropylidene(2-methyl-4-t-butylcyclopentadienyl)(3'-t-butyl-5'-methylcyclopentadienyl)titanium dichloride, methylene(cyclopentadienyl)(3,4-dimethylcyclopentadienyl)titanium dichloride, methylene(cyclopentadienyl)(3,4-dimethylcyclopentadienyl)titanium chlorohydride, methylene(cyclopentadienyl)(3,4-dimethylcyclopentadienyl)dimethyltitanium, methylene(cyclopentadienyl)(3,4-dimethylcyclopentadienyl) diphenyltitanium, methylene(cyclopentadienyl)(trimethylcyclopentadienyl)titanium dichloride, methylene(cyclopentadienyl)(tetramethylcyclopentadienyl)titanium dichloride, isopropylidene(cyclopentadienyl)(3,4-dimethylcyclopentadienyl)titanium dichloride, isopropylidene(cyclopentadienyl)(2,3,4,5-tetramethylcyclopentadienyl)titanium dichloride, isopropylidene (cyclopentadienyl)(3-methylindenyl)titanium dichloride, isopropylidene(cyclopentadienyl)(fluorenyl) titanium dichloride, isopropylidene(2-methylcyclopentadienyl)(fluorenyl)titanium dichloride, isopropylidene(2,5-dimethylcyclopentadienyl)(3,4-dimethylcyclopentadienyl)titanium dichloride, isopropylidene(2,5-dimethylcyclopentadienyl)(fluorenyl) titanium dichloride, ethylene(cyclopentadienyl)(3,5-dimethylcyclopentadienyl)titanium dichloride, ethylene (cyclopentadienyl)(fluorenyl)titanium dichloride, ethylene (2,5-dimethylcyclopentadienyl)(fluorenyl)titanium dichloride, ethylene(2,5-diethylcyclopentadienyl)(fluorenyl)titanium dichloride, diphenylmethylene (cyclopentadienyl)(3,4-diethylcyclopentadienyl)titanium dichloride, diphenylmethylene(cyclopentadienyl)(3,4-diethylcyclopentadienyl)titanium dichloride, cyclohexylidene(cyclopentadienyl)(fluorenyl)titanium dichloride, cyclohexylidene(2,5 -dimethylcyclopentadienyl) (3',4'-dimethylcyclopentadienyl)titanium dichloride, etc.

(iii) Transition metal compounds having two silylene-crosslinked, conjugated, 5-membered cyclic ligands, such as dimethylsilylenebis (indenyl) titanium dichloride, dimethylsilylenebis (4,5,6,7-tetrahydroindenyl)titanium dichloride, dimethylsilylenebis(2-methylindenyl)titanium dichloride, dimethylsilylenebis(2,4-dimethylindenyl)titanium dichloride, dimethylsilylenebis(2,4-dimethylcyclopentadienyl)(3',5'-dimethylcyclopentadienyl) titanium dichloride, phenylmethylsilylenebis(indenyl) titanium dichloride, phenylmethylsilylenebis(4,5,6,7-tetrahydroindenyl)titanium dichloride, phenylmethylsilylenebis(2,4-dimethylindenyl)titanium dichloride, phenylmethylsilylene(2,4-dimethylcyclopentadienyl)(3',5'-dimethylcyclopentadienyl) titanium dichloride, phenylmethylsilylene(2,3,5-trimethylcyclopentadienyl)(2',4',5'-trimethylcyclopentadienyl)titanium dichloride, phenylmethylsilylenebis(tetramethylcyclopentadienyl) titanium dichloride, diphenylsilylenebis(2,4-dimethylindenyl)titanium dichloride, diphenylsilylenebis(indenyl)titanium dichloride, diphenylsilylenebis(2-methylindenyl)titanium dichloride, tetramethyldisilylenebis(indenyl)titanium dichloride, tetramethyldisilylenebis(cyclopentadienyl)titanium dichloride, tetramethyldisilylene(3-methylcyclopentadienyl)(indenyl)titanium dichloride, dimethylsilylene (cyclopentadienyl)(3,4-dimethylcyclopentadienyl)titanium dichloride, dimethylsilylene(cyclopentadienyl)(trimethylcyclopentadienyl)titanium dichloride, dimethylsilylene(cyclopentadienyl)(tetramethylcyclopentadienyl)titanium dichloride, dimethylsilylene(cyclopentadienyl)(3,4-diethylcyclopentadienyl)titanium dichloride, dimethylsilylene(cyclopentadienyl)(triethylcyclopentadienyl)titanium dichloride, dimethylsilylene(cyclopentadienyl)(tetraethylcyclopentadienyl)titanium dichloride, dimethylsilylene(cyclopentadienyl)(fluorenyl)titanium dichloride, dimethylsilylene(cyclopentadienyl)(2,7-di-t-butylfluorenyl)titanium dichloride, dimethylsilylene(cyclopentadienyl)(octahydrofluorenyl)titanium dichloride, dimethylsilylene(2-methylcyclopentadienyl)(fluorenyl) titanium dichloride, dimethylsilylene(2,5-dimethylcyclopentadienyl)(fluorenyl)titanium dichloride, dimethylsilylene(2-ethylcyclopentadienyl)(fluorenyl) titanium dichloride, dimethylsilylene(2,5-diethylcyclopentadienyl)(fluorenyl)titanium dichloride, diethylsilylene(2-methylcyclopentadienyl)(2',7'-di-t-butylfluorenyl)titanium dichloride, dimethylsilylene (2,5-dimethylcyclopentadienyl)(2',7'-di-t-butylfluorenyl) titanium dichloride, dimethylsilylene(2-ethylcyclopentadienyl)(2',7'-di-t-butylfluorenyl)titanium dichloride, dimethylsilylene(diethylcyclopentadienyl) (2,7-di-t-butylfluorenyl)titanium dichloride, dimethylsilylene (methylcyclopentadienyl)(octahydrofluorenyl)titanium dichloride, dimethylsilylene(dimethylcyclopentadienyl) (octahydrofluorenyl)titanium dichloride, dimethylsilylene (ethylcyclopentadienyl)(octahydrofluorenyl)titanium dichloride, dimethylsilylene(diethylcyclopentadienyl) (octahydrofluorenyl)titanium dichloride, etc.

(iv) Transition metal compounds having two conjugated, 5-membered cyclic ligands, in which the two ligands are crosslinked with a germanium-, aluminium-, boron-, phosphorus- or nitrogen-containing hydrocarbon group, such as dimethylgermylenebis(indenyl)titanium dichloride, dimethylgermylene(cyclopentadienyl)(fluorenyl)titanium dichloride, methylalumylenebis(indenyl)titanium dichloride, phenylamylenebis(indenyl)titanium dichloride, phenylphosphylenebis(indenyl)titanium dichloride, ethylborylenebis(indenyl)titanium dichloride, phenylaminylenebis(indenyl)titanium dichloride, phenylamylene(cyclopentadienyl)(fluorenyl)titanium dichloride, etc.

(v) Transition metal compounds having one conjugated, 5-membered cyclic ligand, such as pentamethylcyclopentadienyl-bis(phenyl)aminotitanium dichloride, indenyl-bis(phenyl)aminotitanium dichloride, pentamethylcyclopentadienyl-bis(trimethylsilyl) aminotitanium dichloride, pentamethylcyclopentadienylphenoxytitanium dichloride, dimethylsilylene (tetramethylcyclopentadienyl)phenylaminotitanium dichloride, dimethylsilylene(tetrahydroindenyl) decylaminotitanium dichloride, dimethylsilylene (tetrahydroindenyl)[bis(trimethylsilyl)amino]titanium dichloride, dimethylgermylene (tetramethylcyclopentadienyl)phenylaminotitanium dichloride, etc.

(vi) Transition metal compounds having two conjugated, 5-membered cyclic ligands in which the ligands are double-crosslinked, such as (1,1'-dimethylsilylene)(2,2'-isopropylidene)-bis(cyclopentadienyl)titanium dichloride, (1,1'-dimethylsilylene)(2,2'-dimethylsilylene)-bis (cyclopentadienyl)titanium dichloride, (1,1'-dimethylsilylene)(2,2'-isopropylidene)-bis (cyclopentadienyl)dimethyltitanium, (1,1'-dimethylsilylene) (2,2'-isopropylidene)-bis(cyclopentadienyl) dibenzyltitanium, (1,1'-dimethylsilylene)(2,2'-isopropylidene)-bis(cyclopentadienyl)bis(trimethylsilyl) titanium, (1,1'-dimethylsilylene)(2,2'-isopropylidene)-bis (cyclopentadienyl)bis(trimethylsilylmethyl)titanium, (1,2'-dimethylsilylene)(2,1'-ethylene)-bis(indenyl)titanium dichloride, (1,1'-dimethylsilylene)(2,2'-ethylene)-bis (indenyl)titanium dichloride, (1,1'-ethylene)(2,2'-dimethylsilylene)-bis(indenyl)titanium dichloride, (1,1'-dimethylsilylene)(2,2'-cyclohexylidene)-bis(indenyl) titanium dichloride, etc.

(vii) Derivatives from compounds of (i) to (vi) noted above, which are produced by substituting the chlorine atoms in those compounds of (i) to (vi) with any of bromine atoms, iodine atoms, hydrogen atoms, methyl groups, phenyl groups and others, and/or by substituting the center metal, titanium in those transition metal compounds with any of zirconium, hafnium, niobium, molybdenum, tungsten and others.

(viii) Of the compounds of (1) to (vii), the transition metal compounds having one conjugated, 5-membered cyclic ligand of (v) are especially preferably employed in producing styrenic polymers having a syndiotactic structure.

(II) As specific examples of the transition metal compounds of formula (3), mentioned are the following compounds.

Above all, preferred are transition metal compounds of formula (3) where the group $(C_5H_{5-e}R^4_e)$ is any of the following formulae (I) to (VII):

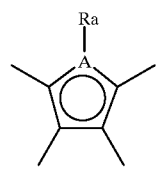 (I)

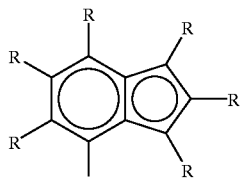 (II)

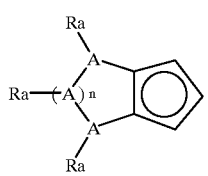 (III)

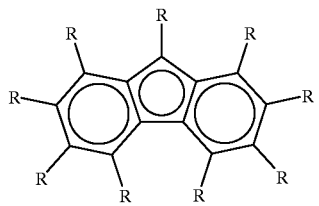 (IV)

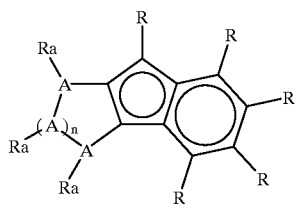 (V)

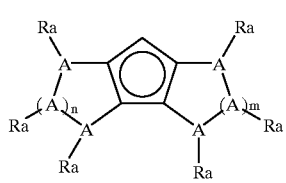 (VI)

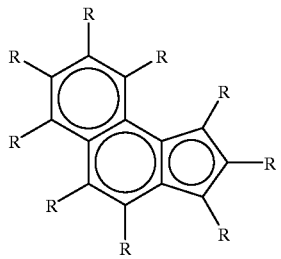 (VII)

wherein

A represents an element of Group 13, 14, 15 or 16, and plural A's may be the same or different;

R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and optionally may be bonded to each other to form a cyclic structure;

a represents 0, 1 or 2; and n and m each represent an integer of 1 or more.

Concretely, the element A includes, for example, Si, C, P, B and N.

Specific examples of the group $(C_5H_{5-e}R^4_e)$ are mentioned below.

In indenyl groups and fluorenyl groups, the position of the substituent is numbered as follows:

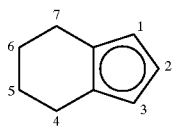 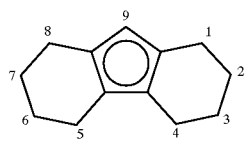

The group $(C_5H_{5-e}R^4_e)$ includes, for example, a cyclopentadienyl group, a methylcyclopentadienyl group, a 1,2-dimethylcyclopentadienyl group, a 1,3-dimethylcyclopentadienyl group, a 1,2,3-trimethylcyclopentadienyl group, a 1,3,4-trimethylcyclopentadienyl group, a tetramethylcyclopentadienyl group, a pentamethylcyclopentadienyl group, an ethylcyclopentadienyl group, a 1,2-diethylcyclopentadienyl group, a 1,3-diethylcyclopentadienyl group, a 1,2,3-triethylcyclopentadienyl group, a 1,3,4-triethylcyclopentadienyl group, a tetraethylcyclopentadienyl group, a pentaethylcyclopentadienyl group, an indenyl group, a 1-methylindenyl group, a 1,2-dimethylindenyl group, a 1,3-dimethylindenyl group, a 1,2,3-trimethylindenyl group, a 2-methylindenyl group, a 1-ethylindenyl group, a 1-ethyl-2-methylindenyl group, a 1-ethyl-3-methylindenyl group, a 1-ethyl-2,3-dimethylindenyl group, a 1,2-diethylindenyl group, a 1,3-diethylindenyl group, a 1,2,3-triethylindenyl group, a 2-ethylindenyl group, a 1-methyl-2-ethylindenyl group, a 1,3-dimethyl-2-ethylindenyl group, a 4,5,6,7-tetrahydroindenyl group, a 1-methyl-4,5,6,7-tetrahydroindenyl group, a 1,2-dimethyl-4,5,6,7-tetrahydroindenyl group, a 1, 3-dimethyl-4,5,6,7-tetrahydroindenyl group, a 1,2,3-trimethyl-4,5,6,7-tetrahydroindenyl group, a 2-methyl-4,5,6,7-tetrahydroindenyl group, a 1-ethyl-4,5,6,7-tetrahydroindenyl group, a 1-ethyl-2-methyl-4,5,6,7-tetrahydroindenyl group, a 1-ethyl-3-methyl-4,5,6,7-tetrahydroindenyl group, a 1-ethyl-2,3-dimethyl-4,5,6,7-tetrahydroindenyl group, a 1,2-diethyl-4,5,6,7-tetrahydroindenyl group, a 1,2-diethyl-3-methyl-4,5,6,7-tetrahydroindenyl group, a 1,3-diethyl-4,5,6,7-tetrahydroindenyl group, a 1,3-diethyl-2-methyl-4,5,6,7-tetrahydroindenyl group, a 1,2,3-triethyl-4,5,6,7-tetrahydroindenyl group, a 2-ethyl-4,5,6,7-tetrahydroindenyl group, a 1-methyl-2-ethyl-4,5,6,7-tetrahydroindenyl group, a 1,3-dimethyl-2-ethyl-4,5,6,7-tetrahydroindenyl group, a fluorenyl group, a 9-methylfluorenyl group, a 9-ethylfluorenyl group, a 1,2,3,4-tetrahydrofluorenyl group, a 9-methyl-1,2,3,4-tetrahydrofluorenyl group, a 9-ethyl-1,2,3,4-tetrahydrofluorenyl group, a 1,2,3,4,5,6,7,8-octahydrofluorenyl group, a 9-methyl-1,2,3,4,5,6,7,8-octahydrofluorenyl group, a 9-ethyl-1,2,3,4,5,6,7,8-octahydrofluorenyl group, etc.

Specific examples of the transition metal compounds of formula (3) are as follows:

Cyclopentadienyltitanium trichloride, cyclopentadienyltitaniumtrimethyl, cyclopentadienyltitanium trimethoxide, cyclopentadienyltitaniumtribenzyl, methylcyclopentadienyltitanium trichloride, methylcyclopentadienyltitaniumtrimethyl, methylcyclopentadienyltitanium trimethoxide, methylcyclopentadienyltitaniumtribenzyl, dimethylcyclopentadienyltitanium trichloride, dimethylcyclopentadienyltitaniumtrimethyl, dimethylcyclopentadienyltitanium trimethoxide, dimethylcyclopentadienyltitaniumtribenzyl, trimethylcyclopentadienyltitanium trichloride, trimethylcyclopentadienyltitaniumtrimethyl, trimethylcyclopentadienyltitanium trimethoxide, trimethylcyclopentadienyltitaniumtribenzyl, tetramethylcyclopentadienyltitanium trichloride, tetramethylcyclopentadienyltitaniumtrimethyl, tetramethylcyclopentadienyltitanium trimethoxide, tetramethylcyclopentadienyltitaniumtribenzyl, pentamethylcyclopentadienyltitanium trichloride, pentamethylcyclopentadienyltitaniumtrimethyl, pentamethylcyclopentadienyltitanium trimethoxide, pentamethylcyclopentadienyltitaniumtribenzyl, indenyltitanium trichloride, indenyltitaniumtrimethyl, indenyltitanium trimethoxide, indenyltitaniumtribenzyl, 1-methylindenyltitanium trichloride, 1-methylindenyltitaniumtrimethyl, 1-methylindenyltitanium trimethoxide, 1-methylindenyltitaniumtribenzyl, 2-methylindenyltitanium trichloride, 2-methylindenyltitaniumtrimethyl, 2-methylindenyltitanium trimethoxide, 1-methylindenyltitaniumtribenzyl, 1,2-dimehtylindenyltitanium trichloride, 1,2-dimethylindenyltitaniumtrimethyl, 1,2-dimethylindenyltitanium trimethoxide, 1,2-dimethylindenyltitaniumtribenzyl, 1,3-dimethylindenyltitanium trichloride, 1,3-dimethylindenyltitaniumtrimethyl, 1,3-dimethylindenyltitanium trimethoxide, 1,3-dimethylindenyltitaniumtribenzyl, 1,2,3-trimethylindenyltitanium trichloride, 1,2,3-trimethylindenyltitaniumtrimethyl, 1,2,3-trimethylindenyltitanium trimethoxide, 1,2,3-trimethylindenyltitaniumtribenzyl, 1,2,3,4,5,6,7-heptamethylindenyltitanium trichloride, 1,2,3,4,5,6,7-heptamethylindenyltitaniumtrimethyl, 1,2,3,4,5,6,7-heptamethylindenyltitanium trimethoxide, 1,2,3,4,5,6,7-heptamethylindenyltitaniumtribenzyl, 4,5,6,7-tetrahydroindenyltitanium trichloride, 4,5,6,7-tetrahydroindenyltitaniumtrimethyl, 4,5,6,7-tetrahydroindenyltitanium trimethoxide, 4,5,6,7-tetrahydroindenyltitaniumtribenzyl, 1-methyl-4,5,6,7-tetrahydroindenyltitanium trichloride, 1-methyl-4,5,6,7-tetrahydroindenyltitaniumtrimethyl, 1-methyl-4,5,6,7-tetrahydroindenyltitanium trimethoxide, 1-methyl-4,5,6,7-tetrahydroindenyltitaniumtribenzyl, 2-methyl-4, 5,6,7-tetrahydroindenyltitanium trichloride, 2-methyl-4,5,6,7-tetrahydroindenyltitanium trimethoxide, 2-methyl-4,5,6,7- tetrahydroindenyltitaniumtribenzyl, 1,2-dimethyl-4,5,6,7-tetrahydroindenyltitanium trichloride, 1,2-dimethyl-4,5,6,7-tetrahydroindenyltitaniumtrimethyl, 1,2-dimethyl-4,5,6,7-tetrahydroindenyltitanium trimethoxide, 1,2-dimethyl-4,5,6,7-tetrahydroindenyltitaniumtribenzyl, 1,3-dimethyl-4,5,6,7-tetrahydroindenyltitanium trichloride, 1,3-dimethyl-4,5,6,7-tetrahydroindenyltitaniumtrimethyl, 1,3-dimethyl-4,5,6,7-tetrahydroindenyltitanium trimethoxide, 1,3-dimethyl-4,5,6,7-tetrahydroindenyltitaniumtribenzyl, 1,2,3-trimethyl-4,5,6,7-tetrahydroindenyltitanium trichloride, 1,2,3-trimethyl-4,5,6,7-tetrahydroindenyltitaniumtrimethyl, 1,2,3-trimethyl-4,5,6,7-tetrahydroindenyltitanium trimethoxide, 1,2,3-trimethyl-4,5,6,7-tetrahydroindenyltitaniumtribenzyl, 1-ethyl-4,5,6,7-tetrahydroindenyltitanium trichloride, 1-ethyl-4,5,6,7-tetrahydroindenyltitaniumtrimethyl, 1-ethyl-4,5,6,7-tetrahydroindenyltitanium trimethoxide, 1-ethyl-4,5,6,7-tetrahydroindenyltitaniumtribenzyl, 1-ethyl-2-methyl-4,5,6,7-tetrahydroindenyltitanium trichloride, 1-ethyl-2-methyl-4,5,6,7-tetrahydroindenyltitaniumtrimethyl, 1-ethyl-2-methyl-4,5,6,7-tetrahydroindenyltitanium trimethoxide, 1-ethyl-2-methyl-4,5,6,7-tetrahydroindenyltitaniumtribenzyl, 1-ethyl-3-methyl-4,5,6,7-tetrahydroindenyltitanium trichloride, 1-ethyl-3-methyl-4,5,6,7-tetrahydroindenyltitanium trichloride, 1-ethyl-3-methyl-4,5,6,7-tetrahydroindenyltitaniumtrimethyl, 1-ethyl-3-methyl-4,5,6,7-tetrahydroindenyltitanium trimethoxide, 1-ethyl-3-methyl-4,5,6,7-tetrahydroindenyltitaniumtribenzyl, 1-ethyl-2,3-dimethyl-4,5,6,7-tetrahydroindenyltitanium trichloride, 1-ethyl-2,3-dimethyl-4,5,6,7-tetrahydroindenyltitaniumtrimethyl, 1-ethyl-2,3,-dimethyl-4,5,6,7-tetrahydroindenyltitanium trimethoxide, 1-ethyl-2,3-dimethyl-4,5,6,7-tetrahydroindenyltitaniumtribenzyl, 1,2-diethyl-4,5,6,7-tetrahydroindenyltitanium trichloride, 1,2-diethyl-4,5,6,7-tetrahydroindenyltitaniumtrimethyl, 1,2-diethyl-4,5,6,7-tetrahydroindenyltitanium trimethoxide, 1,2-diethyl-4,5,6,7-tetrahydroindenyltitaniumtribenzyl, 1,2 -diethyl-3-methyl-4,5,6,7-tetrahydroindenyltitanium trichloride, 1,2-diethyl-3-methyl-4,5,6,7-tetrahydroindenyltitaniumtrimethyl, 1,2-diethyl-3-methyl-4,5,6,7-tetrahydroindenyltitanium trimethoxide, 1,2-diethyl-3-methyl-4,5,6,7-tetrahydroindenyltitaniumtribenzyl, 1,3-diethyl-4,5,6,7-tetrahydroindenyltitanium trichloride, 1,3-diethyl-4,5,6,7-tetrahydroindenyltitaniumtrimethyl, 1,3-diethyl-4,5,6,7-tetrahydroindenyltitanium trimethoxide, 1,3-diethyl-4,5,6,7-tetrahydroindenyltitaniumtribenzyl, 1,3-diethyl-2-methyl-4,5,6,7-tetrahydroindenyltitanium trichloride, 1,3-diethyl-2-methyl-4,5,6,7-tetrahydroindenyltitaniumtrimethyl, 1,3-diethyl-2-methyl-4,5,6,7-tetrahydroindenyltitanium trimethoxide, 1,3-diethyl-2-methyl-4,5,6,7-tetrahydroindenyltitaniumtribenzyl, 1,2,3-triethyl-4,5,6,7-tetrahydroindenyltitanium trichloride, 1,2,3-triethyl-4,5,6,7-tetrahydroindenyltitaniumtrimethyl, 1,2,3-triethyl-4,5,6,7-tetrahydroindenyltitanium trimethoxide, 1,2,3-triethyl-4,5,6,7-tetrahydroindenyltitaniumtribenzyl, 2-ethyl-4,5,6,7-tetrahydroindenyltitanium trichloride, 2-ethyl-4,5,6,7-tetrahydroindenyltitaniumtrimethyl, 2-ethyl-4,5,6,7-tetrahydroindenyltitanium trimethoxide, 2-ethyl-4,5,6,7-tetrahydroindenyltitaniumtribenzyl, 1-methyl-2 -ethyl-4,5,6,7-tetrahydroindenyltitanium trichloride, 1-methyl-2-ethyl-4,5,6,7-tetrahydroindenyltitaniumtrimethyl, 1-methyl-2-ethyl-4,5,6,7-tetrahydroindenyltitanium trimethoxide, 1-methyl-2-ethyl-4,5,6,7-tetrahydroindenyltitaniumtribenzyl, 1,3-dimethyl-2-ethyl-4,5,6,7-tetrahydroindenyltitanium trichloride, 1,3-dimethyl-2-ethyl-4,5,6,7-tetrahydroindenyltitaniumtrimethyl, 1,3-dimethyl-2-ethyl-4,5,6,7-tetrahydroindenyltitanium trimethoxide, 1,3-dimethyl-2-ethyl-4,5,6,7-tetrahydroindenyltitaniumtribenzyl, 1,2,3,4-tetrahydrofluorenyltitanium trichloride, 1,2,3,4-tetrahydrofluorenyltitaniumtrimethyl, 1,2,3,4-tetrahydrofluorenyltitanium trimethoxide, 1,2,3,4-tetrahydrofluorenyltitaniumtribenzyl, 9-methyl-1,2,3,4-tetrahydrofluorenyltitanium trichloride, 9-methyl-1,2,3,4-tetrahydrofluorenyltitaniumtrimethyl, 9-methyl-1,2,3,4-tetrahydrofluorenyltitanium trimethoxide, 9-methyl-1,2,3,4-tetrahydrofluorenyltitaniumtribenzyl, 9-ethyl-1,2,3,4-tetrahydrofluorenyltitanium trichloride, 9-ethyl-1,2,3,4-tetrahydrofluorenyltitaniumtrimethyl, 9-ethyl-1,2,3,4-tetrahydrofluorenyltitanium trimethoxide, 9-ethyl-1,2,3,4-tetrahydrofluorenyltitaniumtribenzyl, 1,2,3,4,5,6,7,8-octahydrofluorenyltitanium trichloride, 1,2,3,4,5,6,7,8-octahydrofluorenyltitaniumtrimethyl, 1,2,3,4,5,6,7,8-octahydrofluorenyltitanium trimethoxide, 1,2,3,4,5,6,7,8-octahydrofluorenyltitaniumtribenzyl, 9-methyl-1,2,3,4,5,6,7,8-octahydrofluorenyltitanium trichloride, 9-methyl-1,2,3,4,5,6,7,8-octahydrofluorenyltitaniumtrimethyl, 9-methyl-1,2,3,4,5,6,7,8-octahydrofluorenyltitanium trimethoxide, 9-methyl-1,2,3,4,5,6,7,8-octahydrofluorenyltitanium trichloride, 9-ethyl-1,2,3,4,5,6,7,8-octahydrofluorenyltitaniumtrimethyl, 9-ethyl-1,2,3,4,5,6,7,8-octahydrofluorenyltitanium trimethoxide, 9-ethyl-1,2,3,4,5,6,7,8-octahydrofluorenyltitaniumtribenzyl, etc.; as well as their derivatives to be produced by substituting the titanium atom in those compounds with any of zirconium or hafnium, and their analogues with any other transition metal elements of other groups or lanthanoid series. However, these are not limitative. Of those, preferred are titanium compounds.

(III) Specific examples of compounds of general formula (4) are as follows: Tetramethyltitanium, tetrabenzyltitanium, tetraethyltitanium, tetraphenyltitanium, tetramethoxytitanium, tetraethoxytitanium, tetraphenoxytitanium, tetra(dimethylamino)titanium, tetra(diethylamino)titanium, tetra(diphenylamino)titanium; bis-(phenoxo)titanium compounds such as those described in Macromolecules (1997), 30, 1562–1569, and Journal of Organometallic Chemistry 514 (1996), 213–217, etc.; diamidotitanium compounds such as those described in Macromolecules (1996), 29, 5241–5243, Organometallics (1997), 16, 1491–1496, etc.; as well as their derivatives to be produced by substituting the titanium atom in those compounds with any of zirconium or hafnium, and their analogues with any other transition metal elements of other groups or lanthanoid series.

(IV) In transition metal compounds of formula (5) noted above, $M^2$ represents a transition metal of Groups 8 to 10 of the Periodic Table, concretely including iron, cobalt, nickel, palladium, platinum, rhodium, ruthenium, etc. Of those, preferred are nickel and palladium. $L^1$ and $L^2$ each represent a coordination-bonding ligand, and $X^1$ and $Y^1$ each represent a covalent-bonding or ionic-bonding ligand. Like those mentioned hereinabove, $X^1$ and $Y^1$ include, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having a halogen (e.g., $B(C_6H_5)_4$, $BF_4$). Of those, preferred are halogen atoms and hydrocarbon groups.

$X^1$ and $Y^1$ may be the same or different ones. Specific examples of $L^1$ and $L^2$ include triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine, bistrimethylsilylaminobistrimethylsilyliminophosphorane, etc.

$L^1$, $L^2$, $X^1$ and $Y^1$ may be bonded to each other to form a cyclic structure.

The compounds of transition metals of Groups 8 to 10 of the Periodic Table preferably have a diimine compound as the ligand, including, for example, complex compounds of a general formula (6):

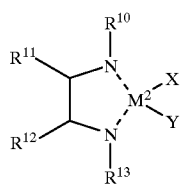

(6)

wherein $R^{10}$ and $R^{13}$ each independently represent an aliphatic hydrocarbon group having from 1 to 20 carbon atoms, or an aromatic group having a hydrocarbon group on the ring and having from 7 to 20 carbon atoms in total; $R^{11}$ and $R^{12}$ each independently represent a hydrogen atom, or a hydrocarbon group having from 1 to 20 carbon atoms, and $R^{11}$ and $R^{12}$ may be bonded to each other to form a ring; X and Y each independently represent a hydrogen atom, or a hydrocarbon group having from 1 to 20 carbon atoms; and $M^2$ represents a transition metal of Groups 8 to 10 of the Periodic Table.

In formula (6), the aliphatic hydrocarbon group having from 1 to 20 carbon atoms for $R^{10}$ and $R^{13}$ may be a linear or branched alkyl group having from 1 to 20 carbon atoms or a cycloalkyl group having from 3 to 20 carbon atoms, concretely including a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a tetradecyl group, a hexadecyl group, an octadecyl group, a cyclopentyl group, a cyclohexyl group, and a cyclooctyl group, etc. Into the ring of the cycloalkyl group, a suitable substituent such as a lower alkyl group may be introduced. The aromatic group having a hydrocarbon group on the ring and having from 7 to 20 carbon atoms in total includes, for example, phenyl and naphthyl groups with at least one linear, branched or cyclic C1–10 alkyl group being on the aromatic ring. For $R^{10}$ and $R^{13}$, preferred is an aromatic group having a hydrocarbon group on the ring, and especially preferred is a 2,6-diisopropylphenylgroup. $R^{10}$ and $R^{13}$ may be the same or different.

The hydrocarbon group having from 1 to 20 carbon atoms for $R^{11}$ and $R^{12}$ includes, for example, a linear or branched alkyl group having from 1 to 20 carbon atoms, a cycloalkyl group having from 3 to 20 carbon atoms, an aryl group having from 6 to 20 carbon atoms, and an aralkyl group having from 7 to 20 carbon atoms. For examples of the linear or branched alkyl group having from 1 to 20 carbon atoms and the cycloalkyl group having from 3 to 20 carbon atoms for $R^{11}$ and $R^{12}$, referred to are those of the C1–20 aliphatic hydrocarbon group mentioned hereinabove for $R^{10}$ and $R^{13}$. The aryl group having from 6 to 20 carbon atoms includes, for example, a phenyl group, a tolyl group, a xylyl group, a naphthyl group, a methylnaphthyl group, etc.; and the aralkyl group having from 7 to 20 carbon atoms includes, for example, a benzyl group, a phenethyl group, etc. $R^{11}$ and $R^{12}$ may be the same or different, and may be bonded to each other to form a ring.

For examples of the hydrocarbon group having from 1 to 20 carbon atoms for X and Y, referred to are those of the C1–20 hydrocarbon group mentioned hereinabove for $R^{11}$ and $R^{12}$. For X and Y, especially preferred is a methyl group. X and Y may be the same or different.

$M^2$ is described hereinabove.

Specific examples of the complex compounds of formula (6) are compounds of the following formulae [1], [2], [3], [4], [5], [6], [7], [8], [9], [10], [11] and [12].

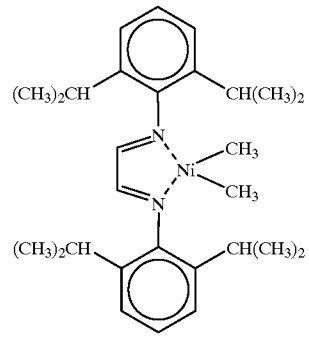

[1]

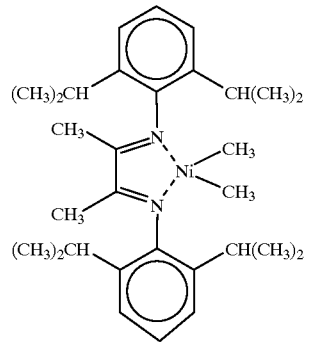

[2]

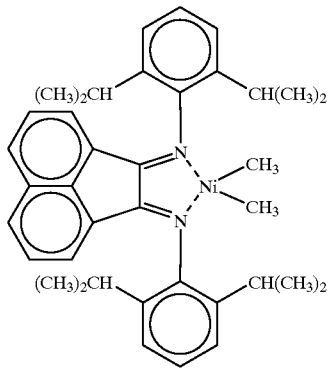

[3]

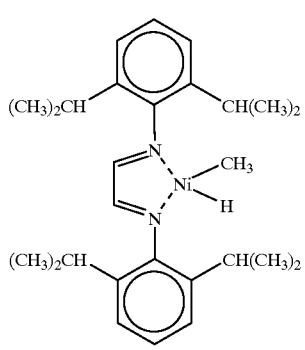
[4]
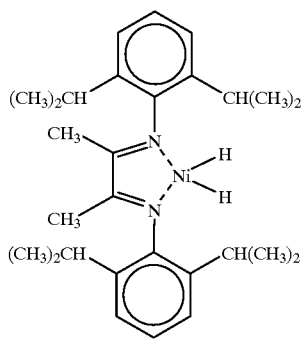
[5]
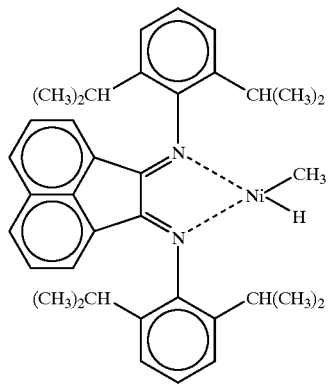
[6]
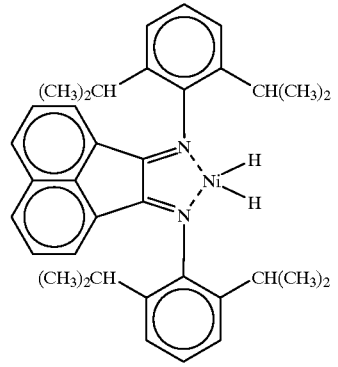
[7]
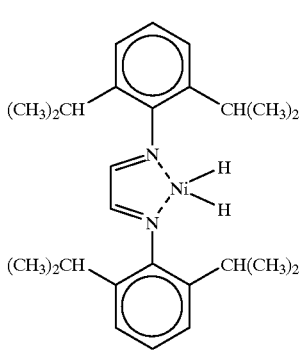
[8]
[9]
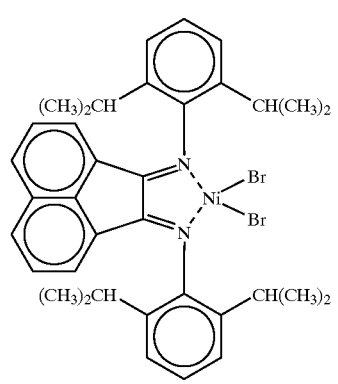
[10]
[11]

-continued

[12]

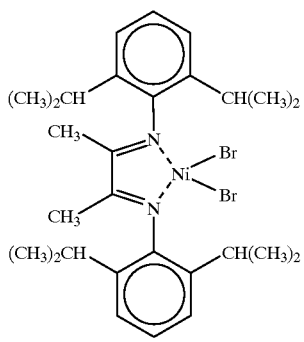

In the invention, one or more of the complex compounds noted above may be used either singly or as combined.

Specific examples of the transition metal compounds of formula (5) include dibromobistriphenylphosphine nickel, dichlorobistriphenylphosphine nickel, dibromodiacetonitrile nickel, dibromodibenzonitrile nickel, dibromo(1,2-bisdiphenylphosphinoethane) nickel, dibromo(1,3-bisdiphenylphosphinopropane) nickel, dibromo(1,1'-diphenylbisphosphinoferrocene) nickel, dimethylbisdiphenylphosphine nickel, dimethyl(1,2-bisdiphenylphosphinoethane) nickel, methyl(1,2-bisdiphenylphosphinoethano)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane) palladium, bis-triphenylphosphinopalladium bistetrafluoroborate, bis(2,2'-bipyridino)methyliron tetrafluoroborate etherate, etc.

Of those, preferred are cationic complexes such as methyl (1,2-bisdiphenylphosphinoethano)nickel tetrafluoroborate, bistriphenylphosphinopalladium bistetrafluoroborate, and bis(2,2'-bipyridino)methyliron tetrafluoroborate etherate.

Component (B)

The component (B) is (a) an oxygen-containing compound and/or (b) a compound capable of reacting with a transition metal compound to form an ionic complex. Preferably, it is (a) an oxygen-containing compound.

(a) Oxygen-containing Compound

The component (a) includes an oxygen-containing compound of a general formula (7):

(7)

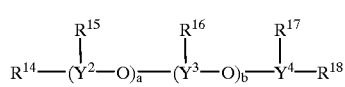

and/or an oxygen-containing compound of a general formula (8):

(8)

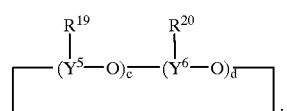

In formulae (7) and (8), $R^{14}$ to $R^{20}$ each represent an alkyl group having from 1 to 8 carbon atoms, concretely including a methyl group, an ethyl group, an n-propyl group, an isopropyl group, all types of butyl groups, all types of pentyl groups, all types of hexyl groups, all types of heptyl groups, and all types octyl groups. $R^{14}$ to $R^{18}$ may be the same or different; and $R^{19}$ and $R^{20}$ may be the same or different. $Y^2$ to $Y^6$ each represent an element of Group 13 of the Periodic Table, concretely including B, Al, Ga, In and Tl. Of those, preferred are B and Al. $Y^2$ to $Y^4$ may be the same or different; and $Y^5$ and $Y^6$ may be the same or different. a to d each represent a number of from 0 to 50, but (a+b) and (c+d) each are at least 1. Preferably, a to d each fall between 0 and 20, more preferably between 0 and 5.

As the oxygen-containing compound for the catalyst component, preferred are alkylaluminoxanes. As their specific examples, mentioned are methylaluminoxane and isobutylaluminoxane.

(b) Compound Capable of Reacting with a Transition Metal Compound to Form an Ionic Complex The compound capable of reacting with a transition metal compound to form an ionic complex includes coordination complex compounds that comprise an anion with plural groups bonded to a metal, and a cation, and Lewis acids. Known are various coordination complex compounds that comprise an anion with plural groups bonded to a metal, and a cation. For example, compounds of the following general formula (9) or (10) are preferably used in the invention.

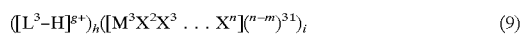

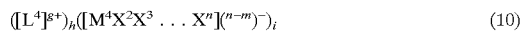

wherein $L^4$ indicates $M^5$, $R^{19}R^{20}M^6$ or $R^{21}{}_3C$, which will be mentioned hereinafter;

$L^3$ represents a Lewis base;

$M^3$ and $M^4$ each represent a metal selected from Group 5 to Group 15 of the Periodic Table;

$M^5$ represents a metal selected from Group 1, and Group 8 to Group 12 of the Periodic Table;

$M^6$ represents a metal selected from Group 8 to Group 10 of the Periodic Table;

$X^2$ to $X^n$ each represent a hydrogen atom, a dialkylamino group, an alkoxy group, an aryloxy group, an alkyl group having from 1 to 20 carbon atoms, an aryl group having from 6 to 20 carbon atoms, an alkylaryl group, an arylalkyl group, a substituted alkyl group, an organometalloid group, or a halogen atom;

$R^{19}$ and $R^{20}$ each represent a cyclopentadienyl group, a substituted cyclopentadienyl group, an indenyl group, or a fluorenyl group;

$R^{21}$ represents an alkyl group;

m indicates the valency of $M^3$ or $M^4$, and represents an integer of from 1 to 7;

n represents an integer of from 2 to 8;

g indicates the ion valency of $L^3$—H or $L^4$, and represents an integer of from 1 to 7;

h represents an integer of 1 or more; and i=h×g/(n−m).

Specific examples of $M^3$ and $M^4$ include atoms of B, Al, Si, P, As, Sb, etc.; those of $M^5$ include atoms of Ag, Cu, Na, Li, etc.; and those of $M^6$ include atoms of Fe, Co, Ni, etc. Specific examples of $X^2$ to $X^n$ include a dimethylamino group, a diethylamino group, etc., as a dialkylamino group; a methoxy group, an ethoxy group, an n-butoxy group, etc., as an alkoxy group; a phenoxy group, a 2,6-dimethylphenoxy group, a naphthyloxy group, etc., as an aryloxy group; a methyl group, an ethyl group, an n-propyl group, an isopropyl group, an n-butyl group, an n-octyl group, a 2-ethylhexyl group, etc., as an alkyl group having from 1 to 20 carbon atoms; a phenyl group, a p-tolyl group, a benzyl group, a pentafluorophenyl group, a 3,5-di(trifluoromethyl)phenyl group, a 4-tert-butylphenyl group, a 2,6-dimethylphenyl group, a 3,5-dimethylphenyl group, a 2,4-dimethylphenyl group, a 1,2-dimethylphenyl group, etc., as an aryl, alkylaryl or arylalkyl group having from 6 to 20 carbon atoms; F, Cl, Br, I, as a halogen; and a pentamethylantimonyl group, a trimethylsilyl group, a trimethylgermyl group, a diphenylarsenyl group, a dicyclohexylantimonyl group, a diphenylboryl group, etc., as an organometalloid group. Specific examples of the substituted cyclopentadienyl group for $R^{19}$ and $R^{20}$ include a methylcyclopentadienyl group, a butylcyclopentadienyl group, a pentamethylcyclopentadienyl group, etc.

In the invention, concretely, the anion with plural groups bonded to a metal includes $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $B(C_6H_5)_4^-$, $PF_6^-$, $P(C_6F_5)_6^-$, $Al(C_6HF_4)_4^-$, etc. The metal cation includes, for example, $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, $Li^+$, etc. The other cation includes, for example, those from nitrogen-containing compounds, such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, N,N-diethylanilinium, etc.; those from carbenium compounds such as triphenylcarbenium, tri(4-methylphenyl)carbenium, tri(4-methoxyphenyl)carbenium, etc.; alkylphosphonium ions such as $CH_3PH_3^+$, $C_2H_5PH_3^+$, $C_3H_7PH_3^+$, $(CH_3)_2PH_2^+$, $(C_2H_5)_2PH_2^+$, $(CH_3H_7)_2PH_2^+$, $(CH_3)_3PH^+$, $(C_2H_5)_3PH^+$, $(C_3H_7)_3PH^+$, $(CF_3)_3PH^+$, $(CH_3)(C_3)_4P^+$, $(C_2H_5)_4P^+$, $(C_3H_7)_4P^+$, etc.; arylphosphonium ions such as $C_6H_5PH_3^+$, $(C_6H_5)PH_2^+$, $(CH_6H_5)_3PH^{30}$, $(C_6H_5)_4P^+$, $(C_6H_5)_2(C_6H_5)PH^+$, $(CH_3)(C_6H_5)PH_2^+$, $(CH_3)_2(C_6H_5)PH^+$, $(C_2H_5)_2(C_6H_5)_2P^+$, etc.

Of the compounds of formulae (9) and (10), concretely, the following are especially preferred. Preferred examples of the compounds of formula (9) include triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetra(pentafluorophenyl)borate, N,N-dimethylanilinium tetrakis(pentafluorophenyl)borate, methyldiphenylammonium tetrakis(pentafluorophenyl)borate, etc. Preferred examples of the compounds of formula (10) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, silver tetrafluoroborate, etc.

The Lewis acid includes, for example, $B(C_6F_5)_3$, $B(C_6HF_4)_3$, $B(C_6H_2F_3)_3$, $B(C_6H_3F_2)_3$, $B(C_6H_4F)_3$, $B(C_6H_5)_3$, $B(C_6CF_3F_4)_3$, $PF_5$, $P(C_6H_5)_5$, $Al(C_6HF_4)_3$, etc.

(C) Alkylating Agent

The catalyst for polymerization of olefins or styrenes of the invention may optionally contain an alkylating agent. Various types of alkylating agents are known and employable herein. For example, employable are alkyl group-having aluminium compounds of a general formula (11):

$$R^{22}{}_m(Al(OR^{23}))_nX_{3-m-n} \quad (11)$$

wherein $R^{22}$ and $R^{23}$ each represent an alkyl group having from 1 to 8 carbon atoms, preferably having from 1 to 4 carbon atoms;

X represents a hydrogen atom or a halogen atom;

$0<m\leq3$, preferably m is 2 or 3, most preferably 3; and $0<n\leq3$, preferably n is 0 or 1;

alkyl group-having magnesium compounds of a general formula (12):

$$R^{22}{}_2Mg \quad (12)$$

wherein $R^{22}$ has the same meaning as above; and alkyl group-having zinc compounds of a general formula (13):

$$R_{222}Zn \quad (13)$$

wherein $R^{22}$ has the same meaning as above.

Of those alkyl group-having compounds, preferred are alkyl group-having aluminium compounds, more preferred are trialkylaluminium and dialkylaluminium compounds. As the compounds, concretely mentioned are trialkylaluminiums such as trimethylaluminium, triethylaluminium, tri-n-propylaluminium, tri-isopropylaluminium, tri-n-butylaluminium, tri-isobutylaluminium, tri-t-butylaluminium, etc. dialkylaluminium halides such as dimethylaluminium chloride, diethylaluminium chloride, di-n-propylaluminium chloride, di-isopropylaluminium chloride, di-n-butylaluminium chloride, di-isobutylaluminium chloride, di-t-butylaluminium chloride, etc. dialkylaluminium alkoxides such as dimethylaluminium methoxide, dimethylaluminium ethoxide, etc; dialkylaluminium hydrides such as dimethylaluminium hydride, diethylaluminium hydride, di-isobutylaluminium hydride, etc. Also mentioned are dialkylmagnesiums such as dimethylmagnesium, diethylmagnesium, di-n-propylmagnesium, di-isopropylmagnesium, etc. dialkylzincs such as dimethylzinc, diethylzinc, di-n-propylzinc, di-isopropylzinc, etc.

(D) Adsorbing Substance for Use in the Invention

The adsorbing substance (D) for use in the invention is one having adsorbability. As a rule, its type is not specifically defined, and any and every substance having adsorbability may be used herein for (D). For example, the adsorbing substance (D) includes porous substances, inorganic oxides, clay, clay minerals and ion-exchanging layered compounds.

The adsorbability of adsorbing substances is generally evaluated in terms of the specific surface area or the pore volume of each substance. The adsorbing substance (D) for use in the invention generally has a specific surface area of at least 30 $m^2/g$ or has a pore volume of at least 0.001 $cm^3/g$, as measured according to the BET method. Preferably, it has a specific surface area of at least 50 $m^2/g$ or has a pore volume of at least 0.01 $cm^3/g$.

The porous substances may be any ones having pores, and their materials, the size and the number of pores therein, and their surface area are not specifically defined. They include, for example, porous organic substances such as porous polymers, and also various porous inorganic oxides. Though not specifically defined, the inorganic oxides may be those having one or more elements of Group 1 to Group 14 of the Periodic Table. One or more such inorganic substances may be used herein either singly or as combined. The inorganic oxides may be either synthetic products or natural substances. Concretely, they include zeolite, alumina silica-alumina, and silica gel, etc.

As the adsorbing substance (D), also usable are phyllo-structured substances having interlayer spaces, such as clay, clay minerals and ion-exchanging layered compounds.

Clay is an aggregate of fine hydrous silicate minerals. It is plastic when kneaded with a suitable amount of water, and is rigid when dried. When baked at high temperatures, it is sintered. Clay minerals are hydrous silicates which are the essential components constituting clay. These are not limited to only natural ones, but synthetic products of those substances are employable herein.

Ion-exchanging layered compounds are characterized by their crystal structure of such that a plurality of crystal planes formed through ionic bonding or the like are laminated in parallel layers via weak bonding force between the adjacent layers, in which the ions are exchangeable. Some clay minerals are ion-exchanging layered compounds.

For example, phyllosilicic acid compounds belong to clay minerals. Phyllosilicic acid compounds include phyllosilicic acid and phyllosilicates. As natural phyllosilicates, known are montmorillonite, saponite and hectorite of the smectite family; illite and sericite of the mica family; and mixed layer minerals of smectites and micas, or those of micas and vermiculites.

As synthetic products, known are fluoro-tetrasilicon mica, laponite, smectone, etc.

Also mentioned are ion-exchanging compounds having a layered crystal structure, such as $\alpha$-Zr(HPO$_4$)$_2$, $\gamma$-Zr(HPO$_4$)$_2$, $\alpha$-Ti(HPO$_4$)$_2$ and $\gamma$-Ti(HPO$_4$)$_2$, etc. These are not clay minerals.

Examples of clay and clay minerals which do not belong to ion-exchanging layered compounds and which are usable as the component (D) include clay having a low montmorillonite content and referred to as bentonite; kibushi clay comprising montmorillonite and many other components; gairome clay; sepiolite and palygorskite having a fibrous morphology; and amorphous or low-crystalline allophane, and imogolite.

Of clay, clay minerals and ion-exchanging layered compounds noted above, preferred as the component (D) are clay and clay minerals, and most preferred are phyllosilicic acid compounds. Of phyllosilicic acid compounds, preferred are smectites, and more preferred is montmorillonite.

As the component (D), also usable is zeolite. Zeolite includes, for example, natural substances such as mordenite, etc. synthetic products such as zeolite X, zeolite Y, zeolite A, etc. high-silica zeolite with (SiO$_2$/Al$_2$O$_3$)$\geq$20 such as typically ZSM-5; zeolite analogues such as ALPO, SAPO, etc. and amorphous zeolite such as MCM-41, MCM-48, MCM-50, etc.

As the component (D), further usable is activated charcoal, which is not specifically defined.

In the invention, the substances for the component (D) maybe used directly as they are, or may be used after dehydrated under heat. As the case may be, it is desirable to chemically treat the substances for the component (D) for the purpose of removing impurities from them or for modifying their structures and functions.

The chemical treatment referred to herein indicates not only the surface treatment to remove impurities from the surfaces of the substances for the component (D) but also any other treatment to modify the crystal structure and even the layered structure of the substances for the component (D). Concretely, it includes acid treatment, alkali treatment, salt treatment, organic treatment, etc.

The acid treatment is to remove impurities from their surfaces, while releasing cations of, for example, aluminium, iron and magnesium from their crystal structures to thereby enlarge their surface areas. The alkali treatment may destroy the crystal structure of the substances for the component (D), thereby modifying their structure.

The salt treatment and the organic treatment are to form ionic complexes, molecular complexes or organic complexes in the substances for the component (D), whereby the surface area and even the layered structure of the substances maybe changed. Owing to their ion-exchanging ability, the interlayer exchangeable ions in the substances may be exchanged with any other bulky ions to give layered substances having enlarged interlayer spaces.

Preferably, the substances for the component (D) in the invention are dehydrated under heat or subjected to chemical treatment in the manner as above.

If desired, the substances for the component (D) may be processed with silane compounds or aluminium compounds before they are used herein.

The silane compounds include, for example, trialkylsilyl chlorides such as trimethylsilyl chloride, triethylsilyl chloride, triisopropylsilyl chloride, tert-butyldimethylsilyl chloride, tert-butyldiphenylsilyl chloride, phenethyldimethylsilyl chloride, etc.; dialkylsilyl dichlorides such as dimethylsilyl dichloride, diethylsilyl dichloride, diisopropylsilyl dichloride, bis(phenethyl)silyl dichloride, diphenylsilyl dichloride, dimethylsilyl dichloride, ditolylsilyl dichloride, etc.; alkylsilyl trichlorides such as methylsilyl trichloride, ethylsilyl trichloride, isopropylsilyl trichloride, phenylsilyl trichloride, mesitylsilyl trichloride, tolylsilyl trichloride, phenethylsilyl trichloride, etc.; other halides to be derived from the compounds noted above by substituting the chloride moiety with any other halogens; disilazanes such as bis(trimethylsilyl)amide, bis(triethylsilyl)amide, bis(triisopropylsilyl)amide, bis(dimethylethylsilyl)amide, bis(diethylmethylsilyl)amide, bis(dimethylphenylsilyl)amide, bis(dimethyltolyl)amide, bis(dimethylmesityl)amide, etc. polysilanols generally referred to as peralkylpolysiloxypolyols; tetraalkylsilanes such as dimethyldiphenylsilane, diethyldiphenylsilane, diisopropyldiphenylsilane, etc. trialkylsilanes such as trimethylsilane, triethylsilane, triisopropylsilane, tri-tert-butylsilane, triphenylsilane, tritolylsilane, trimesitylsilane, methyldiphenylsilane, dinaphthylmethylsilane, bis(diphenyl)methylsilane, etc.; and also inorganic silicon compounds such as silicon tetrachloride, silicon tetrabromide, etc. preferred are disilazanes, and more preferred are trialkylsilyl chlorides.

The aluminium compounds for processing the substances for the component (D) include, for example, linear aluminoxanes of above formula (7), cyclic aluminoxanes and their associates of above formula (8), and also alkyl group-having aluminium compounds of the following general formula (14):

wherein $R^{24}$ and $R^{25}$ each represent an alkyl group having from 1 to 8, preferably from 1 to 4 carbon atoms;

X represents a hydrogen atom or a halogen atom;

$0<m\leq3$, preferably m=2 or 3, most preferably m=3;

$0\leq n<3$, preferably n=0 or 1.

Of those, preferred are alkyl group-having aluminium compounds of formula (14). Concretely, they include trialkylaluminiums such as trimethylaluminium, triethylaluminium, tripropylaluminium, triisobutylaluminium, tri-t-butylaluminium, etc. halogen- or alkoxy-having alkylaluminiums such as dimethylaluminium chloride, diethylaluminium chloride, dimethylaluminium methoxide, diethylaluminium methoxide, etc. hydrogen-having alkylaluminiums such as dimethylaluminium hydride, diisobutylaluminium hydride, etc. and their modified derivatives.

Of those, preferred are trialkylaluminiums. Of trialkylaluminiums, more preferred is triisobutylaluminium.

It is desirable that the substances for the component (D) in the invention are previously processed with any of silane compounds or aluminium compounds noted above.

2. Method for Producing Olefinic Polymers, and Method for Producing Styrenic Polymers In the method for producing olefinic polymers and the method for producing styrenic polymers according to the invention, favorably used is the catalyst for polymerization of olefins or styrenes noted above, optionally along with an organoaluminium compound, for homopolymerization of olefins or styrenes or for copolymerization of olefins or styrenes with other olefins or styrenes and/or with other monomers (that is, copolymerization of different types of olefins or styrenes, or copolymerization of olefins or styrenes with other monomers, or copolymerization of different types of olefins or styrenes with other monomers).

Olefins to be polymerized in the invention are not specifically defined, but preferred are α-olefins having from 2 to 20 carbon atoms. Of those, especially preferred are ethylene and propylene.

The olefins include, for example, α-olefins such as ethylene, propylene, 1-butene, 3-methyl-1-butene, 4-methyl-1-butene, 4-phenyl-l-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane, etc. halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc. and cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc.

Styrenes to be polymerized in the invention are not specifically defined, but preferred are styrene, alkylstyrenes, and divinylbenzene. Of those, especially preferred are styrene, α-methylstyrene, p-methylstyrene, and divinylbenzene.

The styrenes include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc. alkoxystyrenes such as p-methoxystyrene, o-methoxystyrene, m-methoxystyrene, etc. halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc. and also trimethylsilylstyrene, vinylbenzoates, divinylbenzene.

In the invention, one or more of the olefins and styrenes noted above may be used either singly or as combined in any desired manner.

In the method for producing olefinic polymers or styrenic polymers according to the invention, optionally used is an organoaluminium compound, for which preferred are oxygen-containing aluminium compounds of above formulae (7) and (8) where $Y^1$ to $Y^5$ are Al, and alkyl-having aluminium compounds of above formula (11). The amount of the organoaluminium compound to be added to the polymerization system may be generally such that the molar ratio of aluminium in the organoaluminium compound to the transition metal in the component (A) falls between 0:1 and 10000:1.

In the invention, olefins or styrenes such as those mentioned above may be copolymerized with any other comonomers. The comonomers include, for example, linear diolefins such as butadiene, isoprene, 1,4-pentadiene, 1,5-hexadiene, etc. polycyclic olefins such as norbornene, 1,4,5,8-dimethano-1,2,3,4,4a,5,8,8a-octahydronaphthalene, 2-norbornene, etc. cyclic diolefins such as norbornadiene, 5-ethylidenenorbornene, 5-vinylnorbornene, dicyclopentadiene, etc.; and unsaturated esters such as ethyl acrylate, methyl methacrylate, etc.

In the invention, pre-polymerization of monomers may be effected in the presence of the polymerization catalyst. The pre-polymerization may be attained, for example, by contacting the catalyst with a small amount of olefins or styrenes. Its method is not specifically defined, and may be effected in any ordinary manner. Olefins or styrenes to be used in the pre-polymerization are not specifically defined, and those mentioned above may be used therein. The temperature for the pre-polymerization may fall generally between −20 and 200° C., but preferably between −1° C. and 130° C. In the pre-polymerization, solvents may used, which include, for example, inert hydrocarbons, aliphatic hydrocarbons, aromatic hydrocarbons, monomers, etc.

The mode of olefin or styrene polymerization is not specifically defined, and herein employable is any desired polymerization mode of slurry polymerization, solution polymerization, gas-phase polymerization, bulk polymerization or suspension polymerization.

Solvents may be used in the polymerization. They include, for example, hydrocarbons and halogenohydrocarbons such as benzene, toluene, xylene, n-hexane, n-heptane, cyclohexane, chloromethylene, chloroform, 1,2-dichloroethane, chlorobenzene, etc. One or more such solvents may be used either singly or as combined. Depending on their type, monomers to be polymerized may also serve as solvents.

In view of the catalytic activity for polymerization and of the reactor efficiency, it is desirable that the amount of the catalyst to be in the polymerization system is so controlled that the amount of the component (A) could fall generally between 0.1 and 100 μmols, but preferably between 0.5 and 25 μmols, in one liter of the solvent in the system.

Regarding the polymerization condition, the pressure may fall generally between ordinary pressure and 2000 kg/cM²G. The reaction temperature may fall generally between −50 and 250° C. For controlling the molecular weight of the polymers to be produced, the type and the amount of the catalytic components to be used and the polymerization temperature will be suitably selected. If desired, hydrogen may be introduced into the polymerization system for that purpose.

3. Styrenic Polymers

The styrenic polymers as produced by polymerizing styrenes in the presence of the catalyst of the invention have high syndiotacticity in their styrene chain moiety. High syndiotacticity of the styrene chain moiety in the styrenic polymers is meant to indicate that the stereochemical structure of the polymers is of high syndiotacticity. Specifically, in the styrenic polymers with syndiotacticity, the side chains of phenyl groups or substituted phenyl groups are positioned alternately in the opposite directions relative to the main chain composed of carbon-carbon bonds. The tacticity of the styrenic polymers is determined through nuclear magnetic resonance using isotopic carbon ($^{13}$C-NMR). The tacticity as determined through $^{13}$C-NMR can be represented in terms of the proportion of plural constituent units as bonded in series. For example, for polymers in which two constituent units are bonded in series, their tacticity is represented in terms of the proportion of the diads existing therein; for those in which three are bonded in series, it is represented in terms of the proportion of the triads therein; and for those in which five are bonded in series, it is represented in terms of the proportion of the pentads therein. The "styrenic polymers having a syndiotactic structure" as referred to herein indicate polystyrenes, poly(substituted styrenes), poly (vinylbenzoates) and their mixture as well as copolymers consisting essentially of them, which have a degree of syndiotacticity in terms of racemidiad of generally at least 75%, preferably at least 85%, or in terms of racemipentad of generally at least 30%, preferably at least 50%.

The poly(substituted styrenes) include poly(hydrocarbon-substituted styrenes) such as poly(methylstyrene), poly (ethylstyrene), poly(isopropylstyrene), poly(tert-butylstyrene), poly(phenylstyrene), poly(vinylstyrene), etc. poly(halogenostyrenes) such as poly(chlorostyrene), poly (bromostyrene), poly(fluorostyrene), etc. poly (alkoxystyrenes) such as poly(methoxystyrene), poly (ethoxystyrene), etc. Of those styrenic polymers, preferred are polystyrene, poly(p-methylstyrene), poly(m-methylstyrene), poly(p-tert-butylstyrene), poly(p-chlorostyrene), poly(m-chlorostyrene), poly(p-fluorostyrene), as well as copolymers of styrene and p-methylstyrene, copolymers of styrene and p-tert-butylstyrene, and copolymers of styrene and divinylbenzene.

The styrenic polymers may be homopolymers of one monomer, or copolymers of two or more different types of monomers.

The invention is described in more detail with reference to the following Examples, which, however, are not intended to restrict the scope of the invention.

PRODUCTION EXAMPLE 1

(1) Chemical Treatment of Montmorillonite 40 g of a commercial product of montmorillonite (Kunipia F from Kunimine Industry) as ground in a grinder for 4 hours. 20 g of the powdered montmorillonite was put into a three-necked separatory flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. This treatment was repeated once again. Thus was obtained magnesium chloride-processed montmorillonite. Next, this was dispersed in 160 ml of an aqueous solution of 6% HCl, and stirred under reflux for 2 hours. After having been thus processed, this was washed with water through repeated filtration until the filtration wash became neutral, and then dried. Thus was obtained chemical-treated montmorillonite.

(2) Chemical Treatment of Montmorillonite with Organoaluminium Compound 2.0 g of the chemical-treated montmorillonite that had been prepared in (1) (this had a water content of 10% by weight; the water content was obtained from the weight loss after dehydration under heat at 150° C. for 1 hour; the same shall apply hereinunder) was put into a Schlenk's tube having a capacity of 300 ml, and dispersed in 100 ml of toluene to obtain a slurry, to which was added 6.3 ml (25 mmols) of triisobutylaluminium. The resulting slurry was stirred at room temperature for 60 hours, then heated, and reacted at 90° C. for 1 hour. After the reaction, the supernatant was removed from the reaction mixture, and the remaining solid was washed with 200 ml of toluene. This washing filtration was repeated. Next, toluene was again added to the thus-washed slurry to be 50 ml in total. This was applied to the next step of preparing catalyst samples, as in the following Examples. The processed montmorillonite had a specific surface area of 122 m$^2$/g, as measured according to the BET method.

EXAMPLE 1

(1) Preparation of Catalyst (a)

Nitrogen was introduced into a 50 ml container, into which were put 24 mg of N,N-dimethylanilinium tetrakis (pentafluorophenyl)borate, 25.1 ml of toluene, 0.30 ml of a toluene solution of 2 M triisobutylaluminium, and 0.120 ml of a toluene solution of 250 mM 1,2,3,4,5,6,7,8-octahydrofluorenyltitanium trimethoxide.

25.5 ml of the thus-prepared toluene solution was kept as such for 1 hour, and then 4.5 ml of the toluene slurry of 0.04 g/ml montmorillonite that had been prepared in (2) in Production Example 1 was added thereto, and stirred at room temperature for 1 hour. Then, this was left static for 5 minutes, and the supernatant was removed. This is catalyst (a).

(2) Polymerization of Styrene 5 ml of styrene was put into a 30 ml glass bottle that has been purged with nitrogen. The glass bottle was put in an oil bath at 60° C., and 0.125 ml of the toluene solution of catalyst (a) that had been prepared in (1) was added thereto. The monomer was polymerized at 60° C. for 1 hour in that condition, and then methanol was put into the glass bottle to stop the polymerization. The polymer product formed was washed with methanol, and dried. Thus was obtained 1.31 g of a styrene polymer. The dichloromethane-soluble fraction (atactic polystyrene, APS) was removed from it, and 1.26 g of syndiotactic polystyrene (SPS) was obtained. The activity of the catalyst used was 205 (kg-SPS/g-Ti). The product SPS had a weight-average molecular weight of 229,000.

Comparative Example 1

(1) Preparation of Catalyst (b)

Catalyst (b) was prepared in the same manner as in the step (1) for preparing catalyst (a) in Example 1, except that montmorillonite was not used and that 25.1 ml of toluene was substituted with 29.6 ml of toluene.

(2) Polymerization of Styrene

Styrene was polymerized in the same manner as in Example 1, except that catalyst (b) prepared in the previous step (1) was used in place of catalyst (a). Herein obtained was 1.04 g of a styrene polymer. The dichloromethane-soluble fraction (atactic polystyrene, APS) was removed from it, and 0.99 g of syndiotactic polystyrene (SPS) was obtained. The activity of the catalyst used was 162 (kg-SPS/g-Ti), and was lower than that in Example 1. The product SPS had a weight-average molecular weight of 248,000.

Comparative Example 2

(1) Preparation of Catalyst (c)

Catalyst (c) was prepared in the same manner as in the step (1) for preparing catalyst (a) in Example 1, except that montmorillonite was not removed.

(2) Polymerization of Styrene

Styrene was polymerized in the same manner as in Example 1, except that catalyst (c) prepared in the previous step (1) was used in place of catalyst (a). Herein obtained was 1.30 g of a styrene polymer. The dichloromethane-soluble fraction (atactic polystyrene, APS) was removed from it, and 1.10 g of syndiotactic polystyrene (SPS) was obtained. The activity of the catalyst used was 183 (kg-SPS/g-Ti). The product SPS had a weight-average molecular weight of 235,000. The catalyst activity herein was lower than that in Example 1, and, in addition, the amount of the side-product, APS formed herein was larger than that in Example 1.

EXAMPLE 2

(1) Preparation of Catalyst (d)

Nitrogen was introduced into a 50 ml container, into which were put 23.9 ml of toluene, 0.38 ml of a toluene solution of 2 M triisobutylaluminium, 1.05 ml of a toluene solution of 1.43 M methylaluminoxane, and 0.120 ml of a toluene solution of 250 mM cyclopentadienyltitanium tri-methoxide. 25.5 ml of the thus-prepared toluene solution was kept as such for 1 hour, and then 4.5 ml of the toluene slurry of 0.04 g/ml montmorillonite that had been prepared in (2) in Production Example 1 was added thereto, and stirred at room temperature for 1 hour. Then, this was left static for 5 minutes, and the supernatant was removed. This is catalyst (d).

(2) Polymerization of Styrene

Styrene was polymerized in the same manner as in Example 1, except that catalyst (d) was used in place of catalyst (a). Herein obtained was 1.97 g of a styrene polymer. The dichloromethane-soluble fraction (atactic polystyrene, APS) was removed from it, and 1.90 g of syndiotactic polystyrene (SPS) was obtained. The activity of the catalyst used was 308 (kg-SPS/g-Ti). The product SPS had a weight-average molecular weight of 356,000.

Comparative Example 3

(1) Preparation of Catalyst (e)

Catalyst (e) was prepared in the same manner as in Example 2, except that montmorillonite was not used and that 23.9 ml of toluene was substituted with 28.4 ml of toluene.

(2) Polymerization of Styrene

Styrene was polymerized in the same manner as in Example 2, except that catalyst (e) prepared in the previous step (1) was used in place of catalyst (d). Herein obtained was 1.57 g of a styrene polymer. The dichloromethane-soluble fraction (atactic polystyrene, APS) was removed from it, and 1.53 g of syndiotactic polystyrene (SPS) was obtained. The activity of the catalyst used was 249 (kg-SPS/g-Ti), and was lower than that in Example 2. The product SPS had a weight-average molecular weight of 353,000.

Comparative Example 4

(1) Preparation of Catalyst (f)

Catalyst (f) was prepared in the same manner as in the step (1) for preparing catalyst (d) in Example 2, except that montmorillonite was not removed.

(2) Polymerization of Styrene

Styrene was polymerized in the same manner as in Example 2, except that catalyst (f) prepared in the previous step (1) was used in place of catalyst (d). Herein obtained was 1.98 g of a styrene polymer. The dichloromethane-soluble fraction (atactic polystyrene, APS) was removed from it, and 1.69 g of syndiotactic polystyrene (SPS) was obtained. The activity of the catalyst used was 281 (kg-SPS/g-Ti). The product SPS had a weight-average molecular weight of 354,000. The catalyst activity herein was lower than that in Example 2, and, in addition, the amount of the side-product, APS formed herein was larger than that in Example 2.

As demonstrated hereinabove, the catalyst for polymerization of olefins or styrenes of the invention has high polymerization activity. Using the catalyst, efficiently produced are olefinic polymers and styrenic polymers. In polymerizing styrenes in the presence of the catalyst, the amount of the side-product, atactic polystyrene can be reduced. Accordingly, in the invention, olefinic polymers and styrenic polymers can be produced efficiently and inexpensively. In particular, the catalyst of the invention has the advantage of efficiently and inexpensively producing syndiotactic polystyrene.

What is claimed is:

1. A catalyst for polymerization of olefins or styrenes, which is prepared by contacting (A) a transition metal compound, (B) at least one material selected from the group consisting of oxygen-containing compounds and compounds which react with a transition metal compound to form an ionic complex, and optionally (C) an alkylating agent with each other, and contacting these materials (A), (B) and (C) with an adsorbing substance (D), during or after the contact of materials (A), (B) and (C) with each other, followed by removing the adsorbing substance (D) from the contacted materials (A), (B) and (C).

2. The catalyst for polymerization of olefins or styrenes as claimed in claim 1, wherein the adsorbing substance (D) is a porous substance.

3. The catalyst for polymerization of olefins or styrenes as claimed in claim 1, wherein the adsorbing substance (D) is an inorganic oxide.

4. The catalyst for polymerization of olefins or styrenes as claimed in claim 1, wherein the adsorbing substance (D) is a clay mineral or ion-exchanging layered compound.

5. The catalyst for polymerization of olefins or styrenes as claimed in claim 1, wherein the adsorbing substance (D) is a phyllosilicic acid compound.

6. The catalyst for polymerization of olefins or styrenes as claimed in claim 1, wherein the adsorbing substance (D) is a montmorillonite.

7. The catalyst for polymerization of olefins or styrenes as claimed in any one of claims 1 to 6, wherein the adsorbing substance (D) has a specific surface area of at least 30 m$^2$/g as measured according to the BET method.

8. The catalyst for polymerization of olefins or styrenes as claimed in claim 7, wherein the adsorbing substance (D) has a pore volume of at least 0.001 cm$^3$/g as measured according to the BET method.

9. The catalyst for polymerization of olefins or styrenes as claimed in any one of claims 1 to 6, wherein the transition metal compound (A) is a compound of a transition metal of Group 4, 5 or 6 or Groups 8, 9 or 10 of the Periodic Table.

10. The catalyst for polymerization of olefins or styrenes as claimed in claim 9, wherein the transition metal compound (A) is a compound of one of the following formulae (1) to (5):

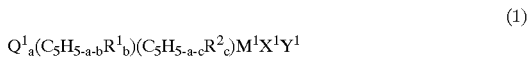

-continued

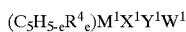  (3)

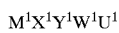  (4)

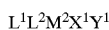  (5)

where

Q$^1$ represents a bonding group that crosslinks the two conjugated five-membered cyclic ligands (C$_5$H$_{5-a-}$R$^1_b$) and (C$_5$H$_{5-a-c}$R$^2_c$);

Q$^2$ represents a bonding group that crosslinks the conjugated five-membered cyclic ligand (C$_5$H$_{5-a-d}$R$^3_d$) and the group Z$^1$;

(C$_5$H$_{5-e}$R$^4_e$) represents a conjugated five-membered cyclic ligand;

R$^1$, R$^2$, R$^3$ and R$^4$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure;

a represents 0, 1 or 2;

b, c and d each represent an integer of from 0 to 5 when a=0, or an integer of from 0 to 4 when a=1, or an integer of from 0 to 3 when a=2;

e represents an integer of from 0 to 5;

M$^1$ represents a transition metal of Groups 4 to 6 of the Periodic Table;

M$^2$ represents a transition metal of Groups 8 to 10 of the Periodic Table;

L$^1$ and L$^2$ each represent a coordination-bonding ligand;

X$^1$, Y$^1$, Z$^1$, W$^1$ and U$^1$ each represent a covalent-bonding or ionic-bonding ligand; and L$^1$, L$^2$, X$^1$, Y$^1$, W$^1$ and U$^1$ may be bonded to each other to form a cyclic structure.

11. The catalyst for polymerization of olefins or styrenes as claimed in claim 10, wherein the transition metal compound (A) is of formula (3) and the group (C$_5$H$_{5-e}$R$^4_e$) in formula (3) is any of the following general formulae (I) to (VII):

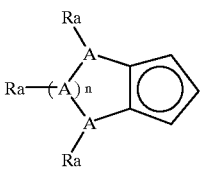  (I)

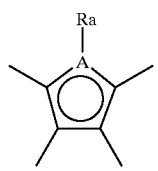  (II)

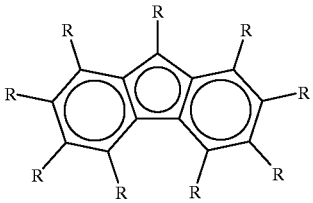  (III)

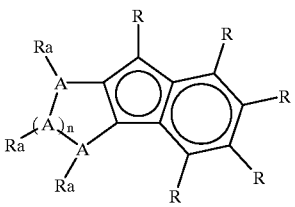  (IV)

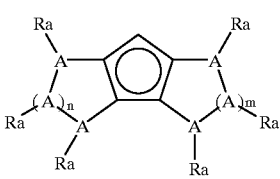  (V)

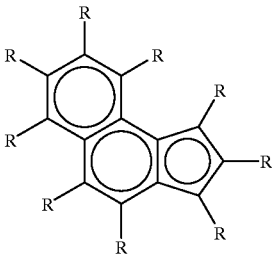  (VI)

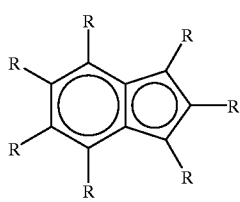  (VII)

where

A represents an element of Group 13, 14, 15 or 16, and plural A's may be the same or different;

R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and optionally may be bonded to each other to form a cyclic structure;

a represents 0, 1 or 2; and n and m each represent an integer of 1 or more.

12. A method for producing a catalyst for polymerization of olefins or styrenes, which comprises contacting (A) a transition metal compound, (B) at least one selected from oxygen-containing compounds and compounds capable of reacting with a transition metal compound to form an ionic complex, and optionally (C) an alkylating agent with each other, with further contacting them with (D) an adsorbing substance during or after the contacting treatment, then followed by removing the adsorbing substance.

* * * * *

UNITED STATES PATENT AND TRADEMARK OFFICE
CERTIFICATE OF CORRECTION

PATENT NO. : 6,255,244 B1
DATED : July 3, 2001
INVENTOR(S) : Yabunouchi

It is certified that error appears in the above-identified patent and that said Letters Patent is hereby corrected as shown below:

Title page, Item [54] and Column 1, line 1,
The title of invention should read:

-- [54] POLYMERIZATION CATALYST FOR OLEFINIC AND STYRENE MONOMER AND POLYMER PRODUCTION METHOD --;

Item [30], the Foreign Application Priority Data should read:

-- [30]    Foreign Application Priority Data

Sep. 14, 1998    (JP) ....................... 10-260377 --

Signed and Sealed this

Nineteenth Day of February, 2002

Attest:

*Attesting Officer*

JAMES E. ROGAN
*Director of the United States Patent and Trademark Office*